UNITED STATES PATENT OFFICE.

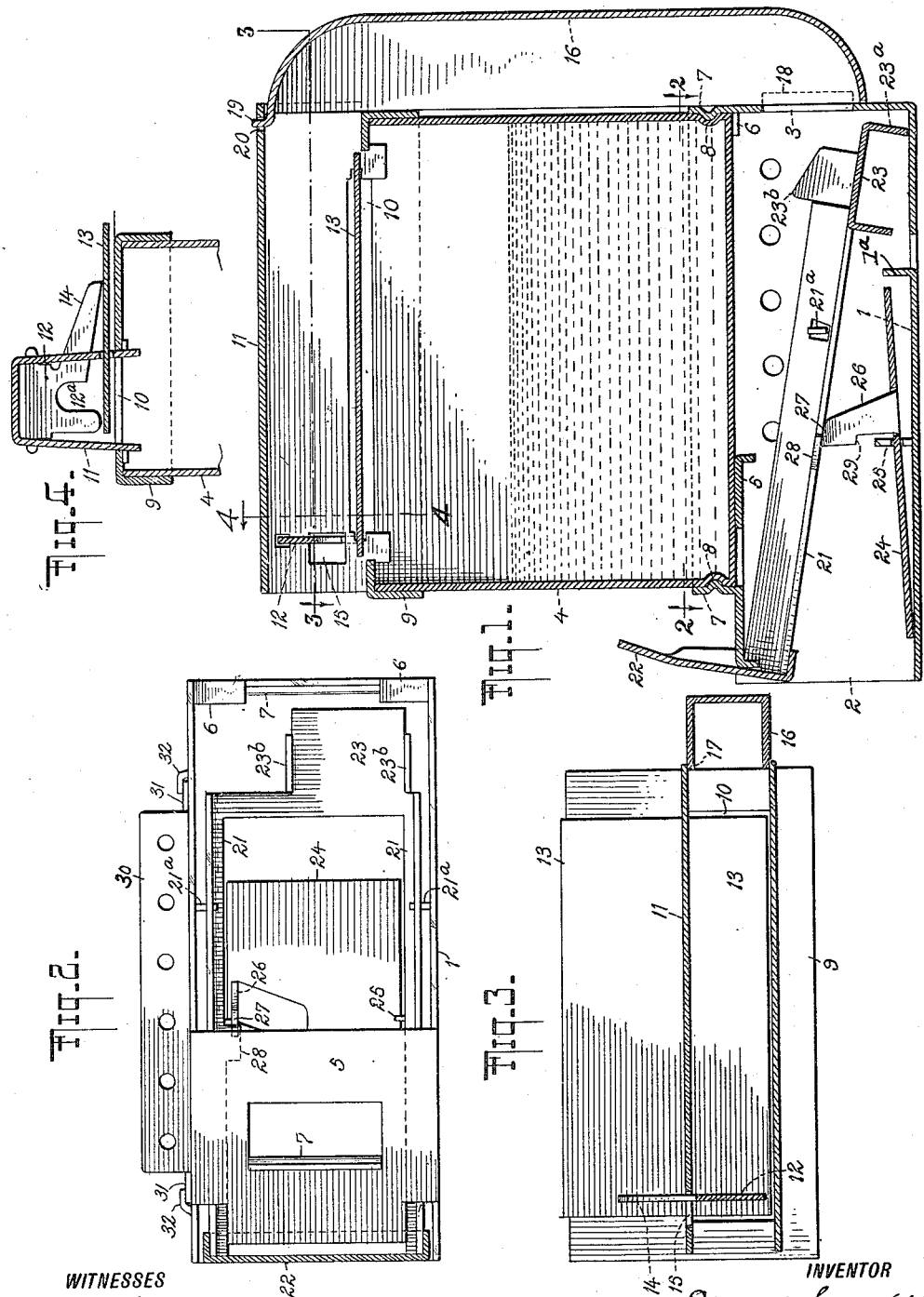

EDMUND SANDKUHL, OF NEW YORK, N. Y.

ANIMAL-TRAP.

1,124,532.  Specification of Letters Patent. Patented Jan. 12, 1915.

Application filed August 25, 1913. Serial No. 786,437.

*To all whom it may concern:*

Be it known that I, EDMUND SANDKUHL, a subject of the Emperor of Germany, and resident of Fort Wadsworth, Staten Island, borough and county of Richmond, city and State of New York, have invented a certain new and useful Improvement in Animal-Traps, of which the following is a specification.
My invention relates to animal traps and more particularly to rat and mouse traps in which the animal after being caught is finally precipitated into a receptacle preferably containing a liquid and thus drowned.
My improvement has for its object to provide a trap of this type from which the animal after having once been caught is not likely to escape and further to so construct said trap that the same will be automatically reset by the animal in its efforts to escape.

Other objects of my invention will appear from the description hereinafter and the features of novelty will be pointed out in the appended claims.
Reference is to be had to the accompanying drawings in which—

Figure 1 is a central longitudinal section of my improved trap; Fig. 2 is a horizontal section thereof on the line 2—2 of Fig. 1 and with the receptacle removed: Fig. 3 is a similar view on the line 3—3 of Fig. 1 and Fig. 4 is a cross-sectional view on the line 4—4 of Fig. 1.

In the drawings which illustrate one specific embodiment of my idea, 1 represents a chamber of any suitable shape and constructed of any suitable material, and having an inlet opening 2 and an exit opening 3. A receptacle 4 is located above the chamber 1 and in the assembled condition of the trap rests upon portions 5 and 6 thereof and is preferably removably connected with said chamber in any suitable manner as by means of resilient catches 7 which enter recesses 8 formed on the receptacle 4 and clamp the same in position. A cover 9 serves to close the upper open end of the receptacle 4 and is provided with a longitudinally extending aperture 10 over which is located and secured a second chamber or hood 11 provided with a swinging door 12 pivotally mounted near one end of said chamber or hood and serving to prevent exit therefrom. A platform 13 is pivotally secured to the wall of said chamber or hood 11 and has a portion extending into the same and over the open-ing 10, and another portion located exteriorly of said chamber 11, as clearly shown in Fig. 4 of the drawings. The pivot about which this platform swings is preferably so located that the greater part of the platform is located exteriorly of said chamber 10, whereby the said platform is overbalanced and consequently normally maintained in position by gravity to close the opening 10 and maintained against swinging movement in one direction by the cover 9. A projection 14 forms part of or is secured to the door 12 and extends through an aperture 15 in the wall of the chamber 11 and normally has its outer end located above and preferably in engagement with the exposed portion of the platform 13, whereby movement of said platform on its pivot in the opposite direction is prevented. The opposite or inlet end of the chamber or hood 11 is connected with the exit end 3 of the chamber 1 by means of a channel or tube 16 extending vertically along the receptacle 4 which latter preferably forms the one wall of said channel 16 as clearly illustrated in Fig. 1. This channel or tube 16 is preferably detachably secured in position in any suitable manner, as for instance by means of lugs 17 and slidably engaging projections 18 on the chamber 1 adjacent to the exit opening 3 and an ear 19 adapted to enter a slot 20 in the top of the chamber 11. The said channel or tube 16 is preferably of angular cross-section and of such dimensions as to prevent the entrapped animal from turning about and retreating once it has entered the channel. The trapping mechanism located in the chamber 1 preferably comprises a rocking frame composed of side members 21 pivoted at 21$^a$, the said pivots 21$^a$ being located nearer to the inner end of the said frame 21 so that the frame will be overbalanced toward the front of the trap as clearly shown in Fig. 1. A door 22 is secured to the forward end of the frame 21 and serves to close the inlet opening 2, while at its rear end the frame 21 carries a shelf 23, a depending projection 23$^a$ of which serves to obstruct the exit opening 3 when the trap has been sprung and the shelf 23 of which serves as a medium whereby the trap may be reset through the efforts of the entrapped animal to escape, as will be hereinafter more fully set forth. A tripping platform 24 is pivoted at 25 in the chamber 1, the pivots 25 being located nearer to the inner end of said platform so as to overbalance the same toward the front and cause it to normally assume the position shown in Fig. 1 of the drawings. A projection 26 forms part of or is secured to the platform 24 and in the operative or set position of the trap has its upper end 27 located beneath a lug 28 forming part of or secured to the frame 21, whereby said frame is locked in an inclined position and the door 22 is maintained in an open position and the trap is set. The said projection 26 is also provided with a shoulder 29 which is adapted to extend over the projection 28 when the trap has been sprung whereby the frame is locked in an oppositely inclined position and the door 23 is secured in its closed position after the animal has entered the chamber 1. A bait receptacle 30 is secured to the one side of the chamber 1 preferably so as to be detachable for instance by means of lugs 31 engaging guides 32 on the chamber 1. It is to be understood that the side wall of the chamber 1 as well as the bait receptacle is preferably perforated so that the bait may be visible and also that the odor thereof may be communicated to the outside.

The trap operates as follows: The animal being attracted by the bait in the receptacle 30 will enter the inlet 2 and will pass along the platform 24 until it has reached a point beyond the pivots 25 when its weight will cause said platform 24 to be tilted and the end 27 of the projection 26 thus swung from beneath the lug 28. The frame 21 being by this means released will, owing to the fact that it is overbalanced toward the front assisted by the weight of the door 22 swing on its pivots and cause the said door 22 to swing downwardly and close the inlet 2 while at the same time the projection 23ª will be swung upwardly and in consequence will obstruct the exit 3. As soon as the animal has left the platform 24 the same will return to normal position and the shoulder 29 will pass over the projection 28 thus locking the frame 21 in place and the door 22 in its closed position. The animal observing the opening 3 which appears to be an outlet of escape will, in its endeavor to escape, place its fore-feet upon the shelf 23 and at the same time will in its maneuvers rest its hind quarters upon the rear end of the platform 24 thus again tilting this platform. The operation will release the lug 28 from the shoulder 29 so that the weight of the animal resting upon the shelf 23 will swing the frame 21 back to the position shown in Fig. 1. In this position the exit 3 is substantially free, so that the animal can enter the channel or tube 16 thus releasing the platform 24 of its weight and permitting the same to resume its normal position with the end 27 of the projection 26 again located beneath the lug 28. The trap has by this means again been reset for further action and the door 22 and its coöperating parts again locked in this set position. The animal in its further efforts to escape will climb upwardly in the channel 16 and will finally reach the chamber 11, and the platform 13. The light entering the opposite end of the chamber 11 through the space between the door 12 and said chamber and through an opening 12ª in said door will attract the animal, which will try to find a means of escape at this end, it being understood that the opening 12ª as well as the space between the door 12 and the chamber 11 is too small to permit the animal to proceed therethrough. In its effort to escape it will swing the door 12 on its pivots and will thus remove the projection 14 from engagement with the exposed portion of the platform 13, which platform owing to the weight of the animal on the inner portion thereof will immediately rock or tilt upon its pivot and thereby cause the entrapped animal to be precipitated into the receptacle 4. In the preferred form this receptacle contains a suitable liquid as for instance water in which the animal may be expeditiously drowned. In order that the animal may be prevented from turning about after it has reached the shelf 23 in its passage to the tube 16, I prefer to make said shelf of small dimensions and to provide the same with spaced projections 23ᵇ extending upwardly from said shelf. Further for the purpose of preventing accidental tripping of the platform 24 and springing of the trap for instance by the tail of the animal as it passes from the chamber 1 to the tube 16. I prefer to provide a projection 1ª which extends upwardly from the bottom of the chamber 1, preferably slightly above and in close proximity to the inner end of the platform 26. This projection 1ª will prevent the tail of the animal from coming into engagement with the platform 24 and in consequence will prevent the trap from being sprung and rendered useless after it has been reset by the entrapped animal in its efforts to escape.

It will be seen that my improved trap absolutely prevents the animal from escaping therefrom and at the same time quickly disposes of the captured animal in a speedy and humane manner. It will further be seen that my improved trap is very compact in construction owing to the location of the various parts of the trap, one above and closely adjacent to each other, and also that all parts thereof are readily detachable for shipping or storing purposes and easily set up for use. This detachable feature of the trap also makes all parts thereof readily accessible for cleaning purposes. By having the tilting platform 13 locked from the outside, it is impossible for the animal in its struggle to escape from the receptacle 4 to actuate the locking device and thus accidentally swing the platform 13 to a position to permit the animal to escape from the receptacle back to other parts of the trap. In pivoting the various pivot elements I have used the tongue-in-notch type of pivot, as this is a simple and inexpensive type of pivot suitable for this purpose which reduces the number of parts and at the same time makes the assembling of the trap a simple matter capable of accomplishment by unskilled labor in a minimum of time. It is, of course, to be understood that I do not limit myself to this type of pivot construction and that other forms may be used if desirable. In addition to this wherever possible I have stamped the parts out of sheet metal whereby a very simple and cheap construction is secured.

Various changes in the specific structure shown and described may be made within the scope of the claims without departing from the spirit of my invention.

I claim:

1. In a mouse or rat trap, a chamber having entrance and exit openings, a rocking lever mounted in said chamber, a gravity operated door carried by said lever at one end thereof and adapted to close the said entrance opening, means for locking said door in both its open and its closed position, a tripping platform in said chamber adapted to be actuated by the weight of the animal whereby the door is released in either position and a projection carried by said lever at its opposite end and adapted to provide a foothold for said animal whereby the said door is returned to an open position, said projection obstructing the exit opening when the door is closed and freeing same when the door is open.

2. In a rat or mouse trap, a chamber having entrance and exit openings, a door adapted to close said entrance opening, a projection connected to move with said door and adapted to obstruct the exit opening and to provide a foot hold for the entrapped animal whereby the door is returned to an open position and means for locking said door in either its open or its closed position, said means being operated by said animal to release said door.

3. In a rat or mouse trap, a chamber having entrance and exit openings, vertically movable devices connected to move in unison and adapted to concurrently obstruct and free the entrance and exit openings and means adapted to lock said devices in either position, said means being operated by the entrapped animal to release said devices.

4. In a rat or mouse trap, a receptacle having an opening, a passageway communicating with said opening, a tilting platform extending into said passageway and over said opening, a pivoted door extending across said passageway, a projection on said door extending outside of said passageway and locking said tilting platform against operation, a chamber having an entrance opening and an exit opening connected with said passageway, rocking levers in said chamber, a gravity operated door carried by said levers at one end thereof and adapted to close said entrance opening, a projection carried by the said levers at the opposite ends thereof and adapted to obstruct said exit opening, said projection further affording a foothold for the entrapped animal whereby the said door is returned to an open position, a lug connected with said levers to move therewith, a catch adapted to engage said lug in either position of said door whereby the latter is locked in either its open or its closed position and a tilting platform in said chamber adapted to be actuated by said animal and operate said catch to disengage the catch and lug and permit an operation of said door and said projection.

5. In a rat or mouse trap, a receptacle having an open and a closed end, a chamber detachably connected with said receptacle so as to extend across its closed end, trapping mechanism in said chamber, a second chamber detachably connected with said receptacle so as to extend across its open end, a movable bottom for said second chamber whereby the entrapped animal is precipitated into the receptacle, and a detachable channel extending lengthwise and exteriorly of said receptacle and having its opposite ends in communication with said chambers.

6. In a rat or mouse trap, a chamber having an entrance opening, a rocking lever mounted in said chamber, a door carried by said lever and adapted to close said entrance opening, means for locking said door in both its open and closed positions and a tripping platform in said chamber connected with said locking means and adapted to be actuated by the weight of the animal whereby the locking means is actuated to release the door in either of its positions.

In testimony whereof I have hereunto set my hand in the presence of two subscribing witnesses.

EDMUND SANDKUHL.

Witnesses:
GEORGE DU BON,
PETER MANUEL FERNANDEZ.

Copies of this patent may be obtained for five cents each, by addressing the "Commissioner of Patents, Washington, D. C."